(12) United States Patent
Batra et al.

(10) Patent No.: US 10,924,303 B2
(45) Date of Patent: Feb. 16, 2021

(54) SECURE TRAINING SEQUENCE SYMBOL STRUCTURE

(71) Applicant: Apple Inc., Cupertino, CA (US)

(72) Inventors: Anuj Batra, Redwood City, CA (US); Joachim S. Hammerschmidt, Mountain View, CA (US); Eren Sasoglu, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 9 days.

(21) Appl. No.: 16/291,973

(22) Filed: Mar. 4, 2019

(65) Prior Publication Data

US 2019/0273636 A1 Sep. 5, 2019

Related U.S. Application Data

(60) Provisional application No. 62/638,826, filed on Mar. 5, 2018.

(51) Int. Cl.
*H04L 25/02* (2006.01)
*H04L 9/06* (2006.01)
(Continued)

(52) U.S. Cl.
CPC .......... *H04L 25/0212* (2013.01); *G06F 7/582* (2013.01); *H04B 1/711* (2013.01); *H04B 7/0413* (2013.01); *H04L 9/0662* (2013.01); *H04L 9/0869* (2013.01); *H04L 25/03343* (2013.01); *H04L 2025/0377* (2013.01)

(58) Field of Classification Search
CPC ........... H04L 25/0212; H04L 25/03343; H04L 9/0869; H04L 9/0662; H04L 2025/0377; H04L 2209/80; H04L 25/0226; H04L 9/12; H04L 25/4902; H04L 25/0228;
(Continued)

(56) References Cited

U.S. PATENT DOCUMENTS

2002/0172359 A1* 11/2002 Saarinen ................. G06F 7/588
380/46
2003/0072255 A1* 4/2003 Ma ......................... H04L 5/0023
370/208
(Continued)

*Primary Examiner* — Ajit Patel
*Assistant Examiner* — Wilfred Thomas
(74) *Attorney, Agent, or Firm* — Dickinson Wright RLLP

(57) ABSTRACT

A secure training sequence (STS) is included in wireless packets communicated between electronic devices to assist with channel estimation and wireless ranging. The STS includes multiple STS segments generated based on outputs from a cryptographically secure pseudo-random number generator (CSPRNG), the STS segments being separated by guard intervals and formatted in accordance with an 802.15.4 data symbol format that uses burst position modulation (BPM) and binary phase shift keying (BPSK) to map bits from the CSPRNG to burst positions and pulse polarities for the STS symbols. Both a first electronic device, which generates the STS, and a second electronic device, which estimates a communication channel using the STS, have prior private knowledge of cryptographic keys required to generate a non-repetitive single-use pseudo-random (PR) sequence by the CSPRNG. The STS includes two burst position intervals per STS symbol and two possible burst positions within each burst position interval.

20 Claims, 9 Drawing Sheets

(51) Int. Cl.
*H04L 9/08* (2006.01)
*H04L 25/03* (2006.01)
*H04B 1/711* (2011.01)
*H04B 7/0413* (2017.01)
*G06F 7/58* (2006.01)
*H04L 25/49* (2006.01)
*H04B 1/69* (2011.01)
*H04B 1/7163* (2011.01)
*H04L 9/12* (2006.01)

(58) Field of Classification Search
CPC ....... G06F 7/582; H04B 7/0413; H04B 1/711; H04B 1/69; H04B 1/7163; H04B 2001/6908
See application file for complete search history.

(56) References Cited

U.S. PATENT DOCUMENTS

| | | | |
|---|---|---|---|
| 2009/0022236 A1* | 1/2009 | Liu | H04L 7/007 375/260 |
| 2012/0140793 A1* | 6/2012 | Demessie | H04W 52/0229 375/130 |
| 2015/0215729 A1* | 7/2015 | Opshaug | G01S 5/0215 455/456.1 |
| 2017/0155527 A1* | 6/2017 | Li | H04L 27/2613 |
| 2018/0254925 A1* | 9/2018 | Dutz | H04L 25/0212 |

\* cited by examiner

SECURE TRAINING SEQUENCE SYMBOL STRUCTURE

CROSS-REFERENCE TO RELATED APPLICATIONS

This application claims the benefit of U.S. Provisional Application No. 62/638,826, entitled "SECURE TRAINING SEQUENCE SYMBOL STRUCTURE," filed Mar. 5, 2018, which is incorporated by reference herein in its entirety for all purposes.

FIELD

The described embodiments relate generally to wireless communication, including the use of ultra-wideband packets with embedded cryptographically secure training sequences.

BACKGROUND

Ultra-wideband (UWB) systems provide for wireless communication using low power, short range, moderate data rate pulse streams that spread their energy across a very wide frequency bandwidth. UWB transmissions use a combination of burst position modulation (BPM) and binary phase shift keying (BPSK) to transform binary data into a stream of pulses (the time interval associated with a pulse is also referred to as a chip). The Institute of Electrical and Electronics Engineers (IEEE) 802.15 working group specifies wireless personal area networking (WPAN) standards, including a lower power WPAN communication protocol 802.15.4 that defines data packet formats for various low rate and high rate wireless WPANs. Wireless packet transmissions typically begin with a preamble used for detecting the transmission, acquiring synchronization timing and frequency, adaptively training receiver settings, and estimating a transmission channel. The preamble usually includes a series of repeated pre-determined pseudo-random (PR) sequences having desired autocorrelation properties. As the PR sequences are known in advance, a receiver can correlate received data to locate the PR sequence and detect the start of a wireless packet transmission. As the set of possible preamble PR sequences used are known and each preamble includes multiple repetitions of a selected PR sequence, a malicious actor may monitor wireless transmissions, detect the PR sequence, and transmit using the detected PR sequence as part of an attempt to spoof a receiver into falsely detecting the malicious actor as a valid transmitter. Thus, there exists a need for a more secure physical layer training sequence.

SUMMARY

A secure training sequence (STS) is included in wireless packets communicated between electronic devices to assist with accurate channel estimation and wireless ranging. The STS includes multiple STS segments generated based on outputs from a cryptographically secure pseudo-random number generator (CSPRNG), the multiple STS segments being separated by STS guard intervals, which are time periods when no energy is transmitted. The STS segments include multiple STS symbols that are each formatted in accordance with an 802.15.4 data symbol format that uses binary pulse modulation (BPM) and binary phase shift keying (BPSK) to map bits from the CSPRNG to pulse positions within an STS symbol and pulse polarities for the STS symbols. Both a first electronic device that generates the STS and a second electronic device that receives the STS and uses the STS to estimate a communication channel between the first and second electronic devices can have prior private knowledge of cryptographic keys required to generate a non-repetitive single-use pseudo-random (PR) sequence by the CSPRNG. The STS does not include repetitions of published known PR sequences as used for preambles of wireless packets, thus thwarting malicious attackers from sniffing for PR sequences to send as spoofed transmissions to the second electronic device. In some embodiments, the STS includes two burst position intervals per STS symbol and two possible burst positions within each burst position interval, with each burst position interval followed by a guard interval of zero transmitted energy. In some embodiments, a burst includes a single pulse having a polarity determined by bits from the CSPRNG. In some embodiments, a time hopping position of a burst within a burst interval varies for successive STS symbols based on a combination of one or more of: a subset of bits output from the CSPRNG, a set of bits output by a second separate CSPRNG, or a set of bits output by a separate IEEE 802.15.4 PN generator. In some embodiments, the second electronic device derives channel estimates from each STS segment of an STS and compares the channel estimates to each other for consistency and to improve channel estimate accuracy.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
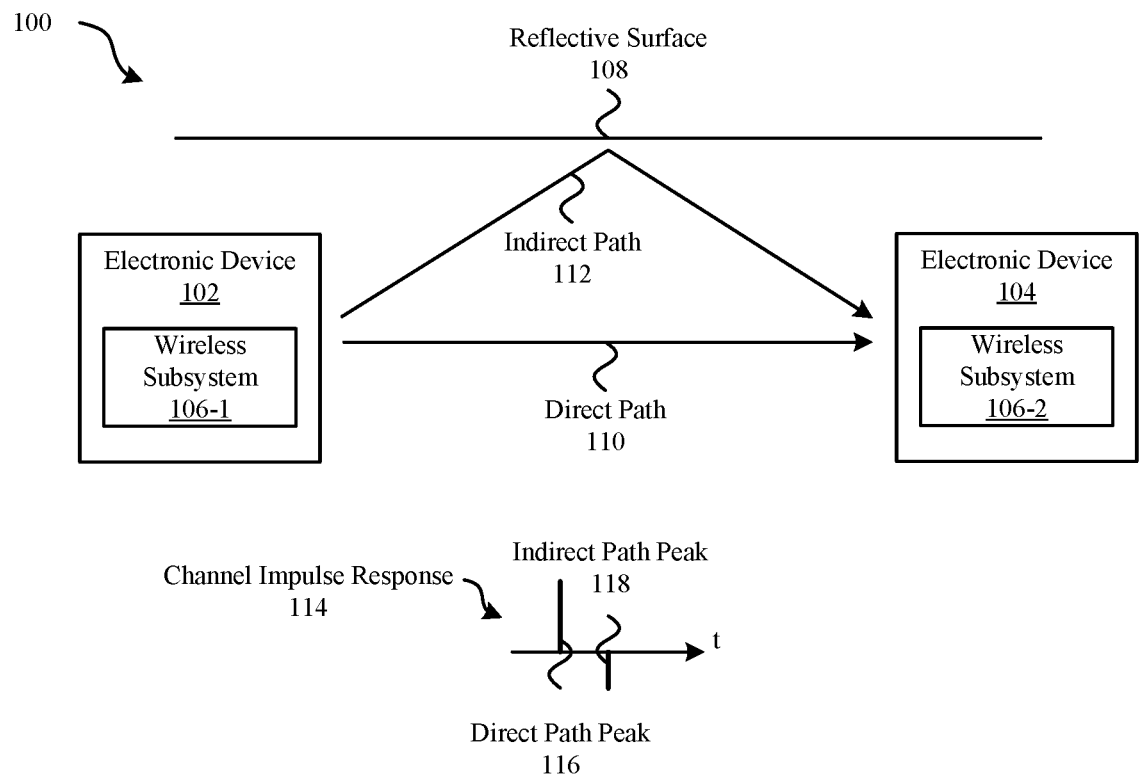
FIG. 1A illustrates a diagram of an exemplary set of electronic devices with multi-path reflection, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Wireless packets communicated between electronic devices include pseudo-random sequences to assist with adaptive receiver algorithms, including for channel estimation of a communication channel between the electronic devices. The wireless packets can include a preamble that uses a known, published pseudo-random sequence with perfect autocorrelation properties. The wireless packets can also include a separate, secure training sequence (STS) to assist with accurate channel estimation and wireless ranging. The STS can be composed of an initial STS guard interval, at least two concatenated STS segments, each STS segment separated from the other by another STS guard interval, and a final STS guard interval. The STS guard intervals can be generated by not transmitting any energy over the time period spanning the STS guard interval. The STS segments can be generated based on outputs from a cryptographically secure pseudo-random number generator (CSPRNG). The STS segments include multiple STS symbols that are each formatted in accordance with an 802.15.4 data symbol format that uses binary pulse modulation (BPM) and binary phase shift keying (BPSK) to map bits from the CSPRNG to pulse positions within an STS symbol and pulse polarities for the STS symbols. Both a first electronic device that generates the STS and a second electronic device that receives the STS and uses the STS to estimate a communication channel between the first and second electronic devices can have prior private knowledge of cryptographic keys required to generate a non-repetitive single-use pseudo-random (PR) sequence by the CSPRNG. The STS does not include repetitions of published known PR sequences as used for preambles of wireless packets, thus thwarting malicious attackers from sniffing for PR sequences to send as spoofed transmissions to the second electronic device. In some embodiments, the STS includes two burst position intervals per STS symbol and two possible burst positions within each burst position interval, with each burst position interval followed by a guard interval of zero transmitted energy. In some embodiments, which burst position interval to use in a given STS symbol is determined by certain bits from the CSPRNG. In some embodiments, a burst of an STS symbol includes a single pulse having a polarity determined by certain other bits from the CSPRNG. In some embodiments, a time hopping position of a burst within a burst interval varies for successive STS symbols based on a combination of one or more of: a subset of bits output from the CSPRNG, a set of bits output by a second separate CSPRNG, or a set of bits output by a separate IEEE 802.15.4 PN generator. In some embodiments, the second electronic device derives channel estimates from each STS segment of an STS and compares the channel estimates to each other for consistency and to improve channel estimate accuracy in the presence of noise and/or interferers.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or fifth generation (5G) or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution- Data Only (EV-DO) network, when LTE and LTE-A networks are otherwise unavailable.

These and other embodiments are discussed below with reference to FIGS. 1A-8; however, those skilled in the art will readily appreciate that the detailed description given herein with respect to these figures is for explanatory purposes only and should not be construed as limiting.

FIG. 1A illustrates a diagram 100 of a set of electronic devices 102, 104 with multi-path reflection. A first electronic device 102 may send a transmission, e.g., one or more wireless packets, using wireless subsystem 106-1 to a second electronic device 104, which receives the transmission using wireless subsystem 106-2. The transmission may traverse a direct path 110, which may represent a shortest distance path, from the first electronic device 102 to the second electronic device 104. The transmission may also traverse an indirect path 112 from the first electronic device 102 to the second electronic device 104, which may represent a longer distance path due to an echo from a reflective surface 108. While there may be any number of propagation paths, with any combination of strong and weak path strengths, the two-path description that follows is chosen for the sake of simplicity and is not to be taken as limiting. The second electronic device 104 can correlate pre-determined sequences included in the transmission to estimate a channel impulse response 114 based on received samples that include a combination of the transmissions via the direct path 110 and the indirect path 112. The channel impulse response 114 can include a stronger direct path peak 116 and a weaker indirect path peak 118. The second electronic device 104 can use the estimated channel impulse response 114 to estimate a distance between the first electronic device 102 and the second wireless device, which can also be referred to as wireless ranging. For wireless ranging, the second electronic device 104 must distinguish between different peaks in the channel impulse response 114 to locate the direct path 110 and also separate the channel impulse response from ambient noise.

Figure 1B:
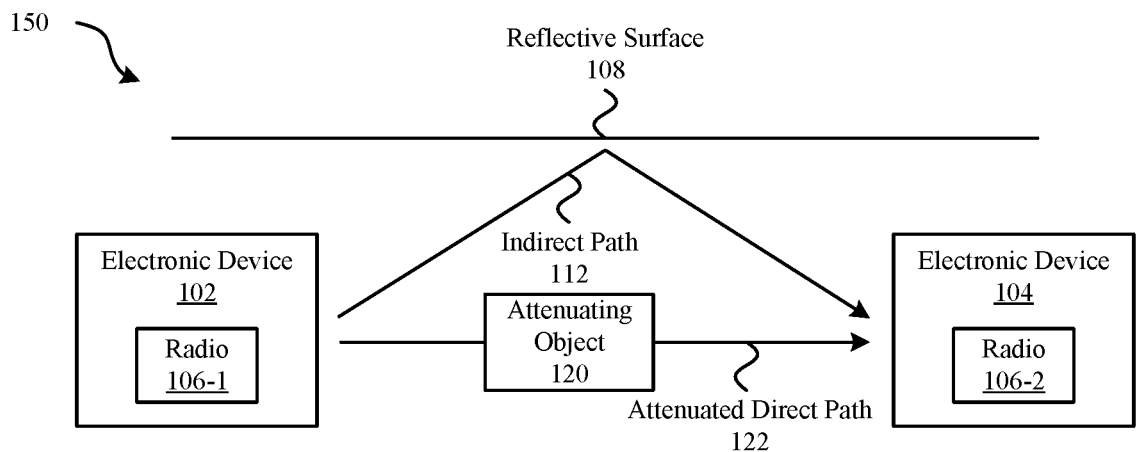
FIG. 1B illustrates a diagram of an exemplary set of electronic devices with attenuation and multi-path reflection, in accordance with some embodiments.
Figure 1B:
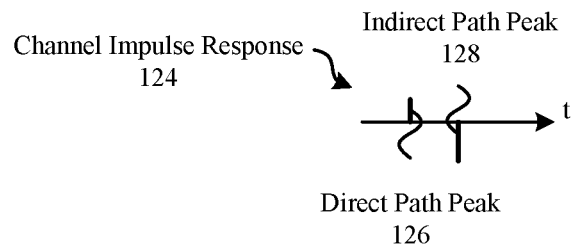

FIG. 1B illustrates a diagram 150 in which communication between the set of electronic devices 102, 104 encounters both multi-path reflection and attenuation. The first electronic device 102 may send a transmission using the wireless subsystem 106-1 to the second electronic device 104, which receives the transmission using the wireless subsystem 106-2. The transmission may traverse an attenuated direct path 122, which may represent the shortest distance path between the first and second electronic devices 102, 104; however, the signal received via the attenuated direct path 122 may be attenuated by the attenuating object 120, thereby reducing the total energy received via the attenuated direct path 122. The transmission may also traverse the indirect path 112 and be received by the second electronic device 104 later than via the attenuated direct path 122. The resulting channel impulse response 124 estimated by the second electronic device 104 can include a weaker direct path peak 126 and a stronger indirect path peak 128. A noted hereinabove, there may be any number of propagation paths, some stronger and some weaker resulting in a channel impulse response (CIR) having multiple peaks, and the CIR 124 shown in FIG. 1B is exemplary but not limiting. The second electronic device 104 may still distinguish between the peaks; however, the direct path peak 126 of FIG. 1B, due to its reduced strength, may be more difficult to separate from receiver noise and other signal distortion phenomena than the direct path peak 116 of FIG. 1A.

Figure 2:
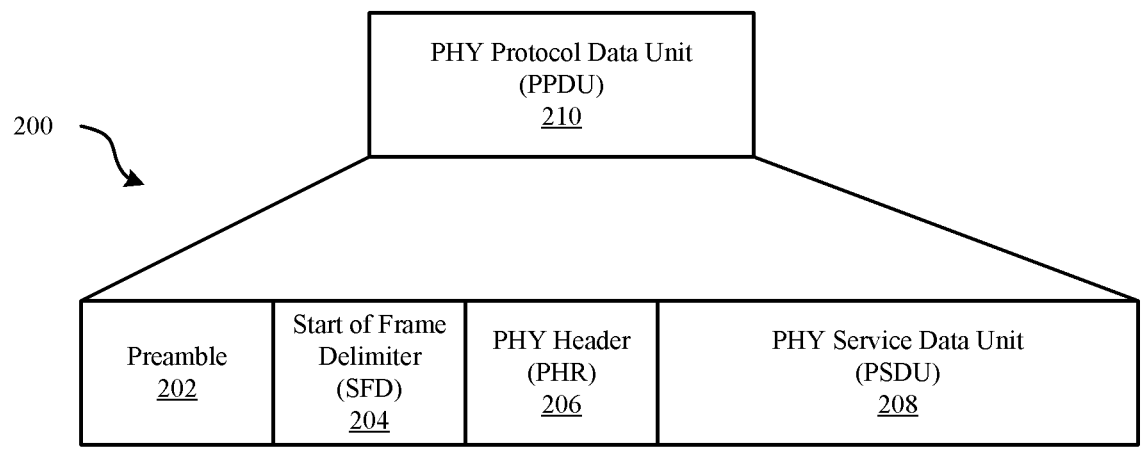
FIG. 2 illustrates a diagram of an exemplary format for an IEEE 802.15.4 ultra-wideband (UWB) physical layer data packet, in accordance with some embodiments.

Accuracy of channel estimation by electronic devices 102, 104 may depend on the use of well-behaved sequences having desired auto-correlation properties. A pseudo-random (PR) sequence having a perfect autocorrelation property will produce a positive result with perfect alignment and zero results for all shifted alignments. Known finite length PR sequences having perfect autocorrelation may be included in preambles of wireless transmission packets, where the PR sequence may be repeated several times to aid detection for the start of a wireless transmission packet by a receiver, e.g., by the wireless subsystem 106-2 of electronic device 104. FIG. 2 illustrates a diagram 200 of an example format for a physical layer protocol data unit (PPDU) 210, such as specified in IEEE 802.15.4 wireless communication protocols. The PPDU 210 includes a preamble 202, which can include a repeated series of pseudo-random sequences followed by a start of frame delimiter (SFD) 204 separating the preamble 202 from the physical layer data, which includes a physical layer header (PHR) 206 followed by a physical layer service data unit (PSDU) 208. As the pseudo-random sequences used for the preamble 202 are known, the wireless subsystem 106-2 of the second electronic device 104 can readily receive and detect the start of a wireless transmission packet; however, other electronic devices may also listen for and detect the same wireless transmission packet and may interfere with proper detection by the second electronic device 104.

Figure 3:
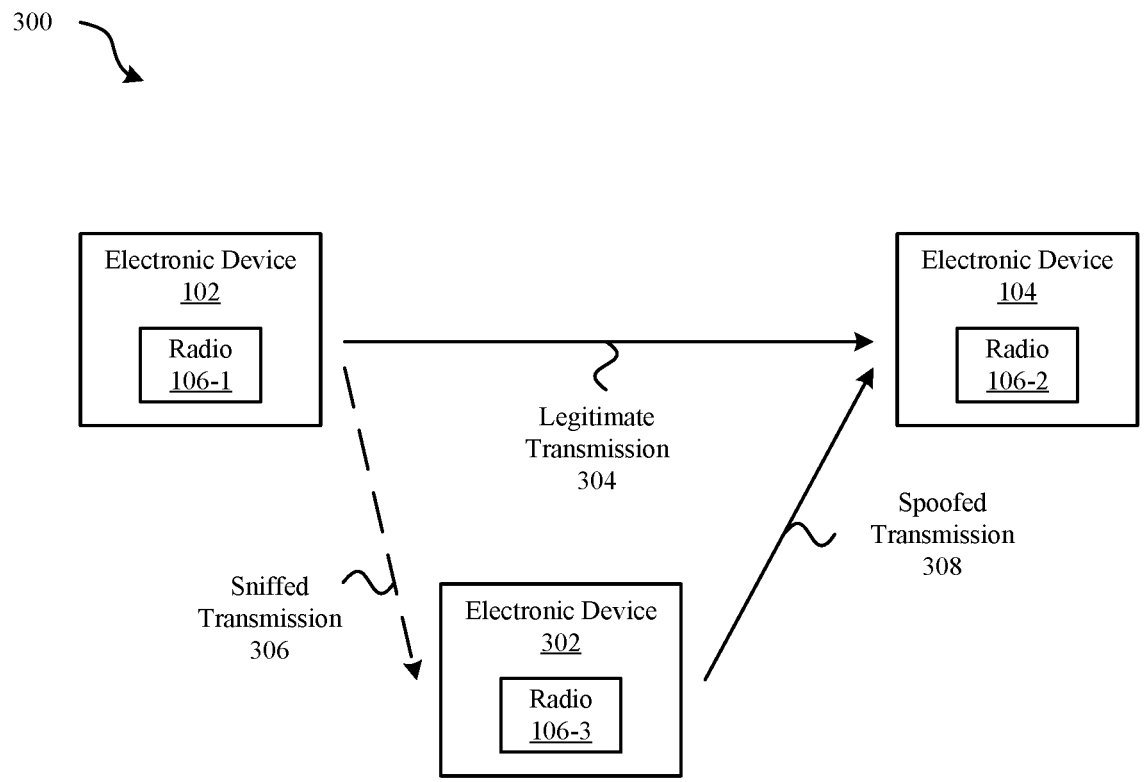
FIG. 3 illustrates a diagram of an example of a malicious actor electronic device interfering with communication between a set of electronic devices, in accordance with some embodiments.

FIG. 3 illustrates a diagram 300 of a third electronic device 302, which represents a malicious actor, that listens for transmissions from the first electronic device 102 and, based on information derived from listening to the transmissions from the first electronic device 102, transmits separately to the second electronic device 104. The first electronic device 102 sends a legitimate transmission 304 to the second electronic device 104. The third electronic device 302 may receive a sniffed transmission 306, such as a portion of the legitimate transmission 304, and after recognizing a pseudo-random sequence used for a preamble of the legitimate transmission 304, may send a spoofed transmission 308 to the second electronic device 104 reusing the pseudo-random sequence to potentially cause the second electronic device 104 to recognize the third electronic device 302 as a legitimate transmitter in place of the first electronic device 102. In some malicious attacks, the third electronic device 302 can react quickly during the preamble transmission from the first electronic device 102 to the second electronic device 104 by injecting to the wireless medium its own preamble signal, using preamble intervals that are identical to those transmitted by the electronic device 102 such that the received spoofed transmission 308 appears time-advanced relative to the legitimate transmission 304 at the second electronic device 104. When such preambles are used for wireless ranging, the second electronic device 104 may errantly determine that the third electronic device 302 is a closest (based on the timing advance), legitimate (based on the known pseudo-random sequence) electronic device, based on channel estimation at a physical layer.

Rather than use a preamble's repetitions of a known pseudo-random sequence, wireless ranging can improve security by using non-repetitive single-use pseudo-random sequences that do not necessarily have perfect autocorrelation properties but may be uniquely determined by the first electronic device 102 and the second electronic device 104 and may be not determinable by the third electronic device 302. These sequences may be referred to as cryptographically secure pseudo-random sequences (CSPRSs). A malicious attacker cannot determine a portion of the CSPRS by listening and repeating sequence patterns. In some embodiments, an Advanced Encryption Standard (AES) cipher block can be used to generate a non-repetitive single-use pseudo-random sequence. Both the first electronic device 102 and the second electronic device 104 can have prior private knowledge of cryptographic keys required to generate the non-repetitive single-use pseudo-random sequence, while the third electronic device 302 will not have knowledge of the cryptographic keys. The non-repetitive single-use pseudo-random sequences generated by the AES cipher block will not have a perfect autocorrelation property but will have low amplitude autocorrelation side lobes relative to a single main autocorrelation peak. In some embodiments, the cryptographic keys are selected to realize a maximum side lobe peak relative to the main peak of an autocorrelation for the generated non-repetitive single-use pseudo-random sequence. In some embodiments, the cryptographic keys are selected to achieve a level of side lobes that are comparable to an estimated or predicted noise level.

Figure 4:
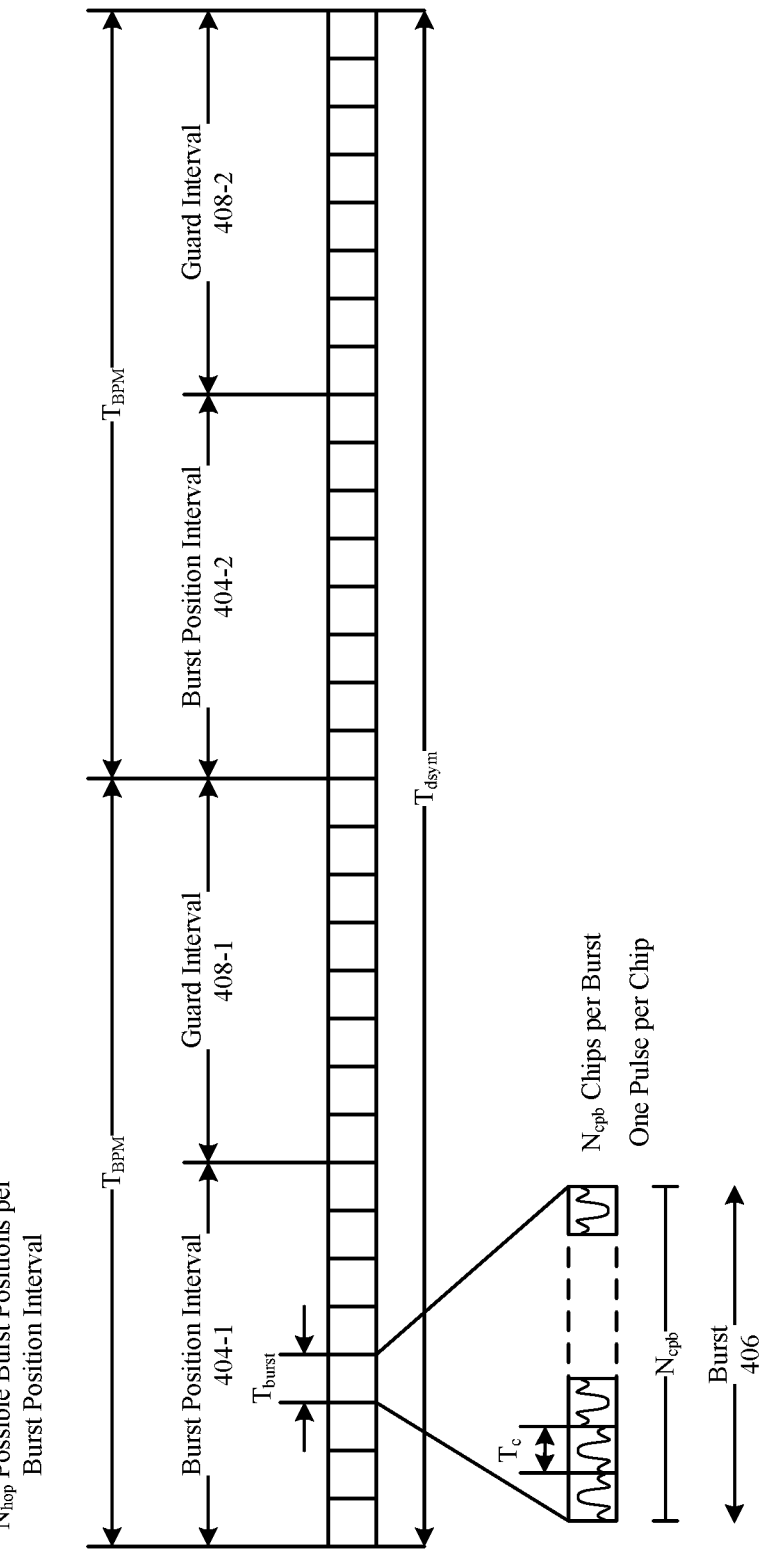
FIG. 4 illustrates a diagram of an exemplary structure for an IEEE 802.15.4 physical layer symbol, in accordance with some embodiments.

FIG. 4 illustrates a diagram 400 of an IEEE 802.15.4 UWB physical layer symbol structure that can be repurposed for transmission of a CSPRS in an UWB communication system. A data symbol 402, which spans a time interval $T_{dsym}$, will include a burst of consecutive pulses (also referred to as chips) at one of multiple burst positions within either a first burst position interval 404-1 or a second burst position interval 404-2. For any given data symbol 402, a burst transmission will be included in one (and only one) of the burst position intervals 404-1, 404-2. Each burst position interval 404-1, 404-2 abuts a corresponding guard interval 408-1, 408-2. The guard intervals 408-1, 408-2 allow for multi-path and other forms of interference to die out between a burst transmission of a first data symbol 402 and a burst transmission of an immediately following second data symbol 402. The burst position interval 404-1 and adjacent guard interval 408-1 together span a time interval $T_{BPM}$, and the burst position interval 404-2 and adjacent guard interval 408-2 together span the same time interval $T_{BPM}$. One bit of a data sequence may be used to determine whether the first burst position interval 404-1 or the second burst position interval 404-2 is used for a given data symbol 402. Thus, the data symbol 402 uses a form of Burst Position Modulation (BPM) to transform a portion of a data sequence into a transmittable waveform. In addition to selection of a burst position interval 404-1 or 404-2, the data symbol 402 based on a first bit, a number of additional bits are used to determine polarities for each pulse (chip) in a burst 406 of $N_{cpb}$ consecutive pulses (chips), where the burst 406 spans a time interval $T_{burst}$ and each pulse (chip) spans a time interval $T_c$. As shown in FIG. 4, a burst of $N_{cpb}$ pulses are encoded using $N_{cpb}$ bits, each bit determining whether a corresponding pulse will have a positive polarity or a negative polarity. Additional side information, separate from the encoded data, is used to determine in which of $N_{hop}$ adjacent burst positions within a burst position interval 404-1, 404-2 the burst is transmitted. The additional side information, e.g., a pseudo-noise (PN) scrambling sequence in 802.15.4, can determine a hopping sequence pattern to use for a sequence of data symbols and can also be used to scramble bit polarities within each burst. Moving the bursts to different positions within each burst position interval reduces burst transmission peak power levels in the frequency domain to satisfy power spectral density masks, such as required by communication regulatory bodies. Individual symbols of a secure training sequence can conform to the IEEE 802.15.4 physical layer symbol structure shown in FIG. 4 as described further herein.

Figure 5:
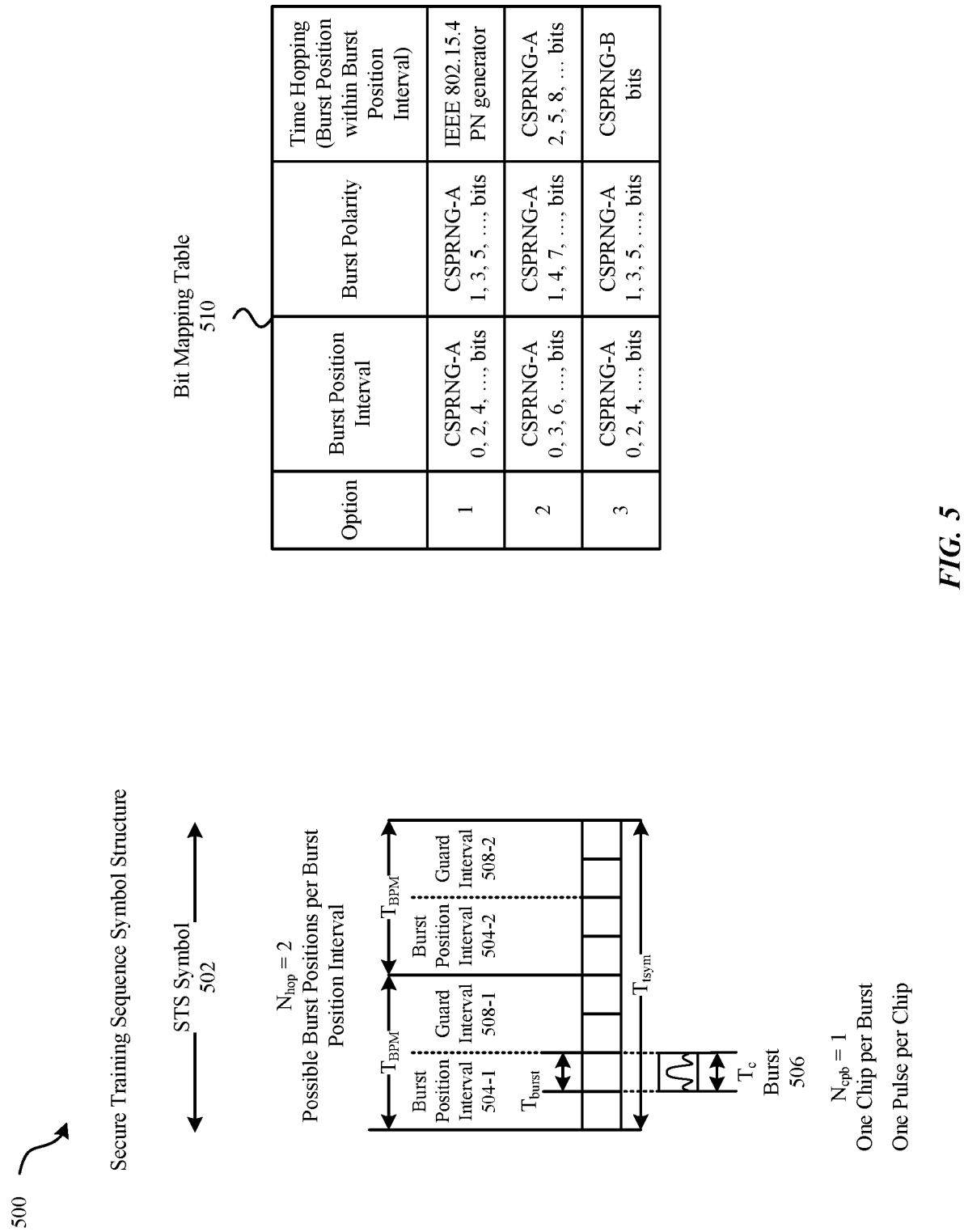
FIG. 5 illustrates a diagram of an exemplary structure for a secure training sequence symbol, in accordance with some embodiments.

FIG. 5 illustrates a diagram 500 of a secure training sequence (STS) symbol structure that can be used to construct an STS to include in a wireless packet. An STS symbol 502 can span a time interval $T_{tsym}$ and include two burst position intervals 504-1, 504-2 and two guard intervals 508-1, 508-2. Within each burst position interval 504-1, 504-2, a burst 506 of one pulse (chip) can occupy one of two different burst positions as the number of possible burst positions per burst position interval $N_{hop}$=2. The burst 506 spans a burst time interval $T_{burst}$, which also corresponds to a pulse (chip) time interval $T_c$ as the number of pulses (chips) per burst $N_{cpb}$=1. In some embodiments, each guard interval 508-1, 508-2 spans a time interval equal to the time interval allocate for a burst position interval 504-1, 504-2.

A cryptographically secure pseudo-random number generator (CSPRG) can output a sequence of bits that are mapped to burst position intervals 504-1, 504-2 and to polarities for pulses (chips) of bursts 506. As there are two possible burst position intervals, a first bit of the CSPRG sequence determines whether the burst is transmitted in the first burst position interval or in the second burst position interval. As there are two possible polarities for a burst, a second bit of the CSPRG sequence determines whether the burst is transmitted with a positive polarity or with a negative polarity. Additionally, in some embodiments, an additional bit determines a time hopping position within a burst position interval (one of $N_{hop}$=2 possible burst positions).

Table 510 outlines several options for mapping bits to position, polarity, and time hopping for an STS. In a first configuration, labeled option 1 in Table 510, alternating bits output from CSPRG-A determine burst position intervals and pulse polarities, e.g., even bits of the CSPRNG-A sequence determine which burst position interval 504-1, 504-2 of an STS symbol 502 is used, while odd bits of the CSPRNG-A sequence determine pulse polarity of burst 506 pulses. Alternatively, the assignment of bits of the CSPRNG-A sequence to burst position interval and burst polarity can be reversed, e.g., even bits of the CSPRNG-A sequence can determine burst position intervals 504-1, 504-2 and odd bits of the CSPRNG-A sequence can determine pulse polarities of bursts 506. Additional, bursts 506 are positioned in one of two different positions within burst position intervals 504-1, 504-2 of STS symbols 502 based on a separate pseudo-random number (PN) generator, e.g., in accordance with the IEEE 802.15.4 PN generator used for time hopping for 802.15.4 transmissions.

In a second configuration, labeled option 2 in Table 510, one of every three bits of the CSPRNG-A sequence determines the burst position interval 504-1, 504-2, one of every three bits determines the burst polarity, and one of every three bits determines a burst position within a burst position interval 504-1, 504-2. Using CSPRNG bits, rather than a pre-determined PN generator such as the IEEE 802.15.4 PN generator, the time hopping burst position pattern provides an additional level of robustness, as a malicious attacker will not have knowledge of the time hopping pattern.

In a third configuration, labeled option 3 in Table 510, alternating bits output from CSPRNG-A determine burst position intervals and pulse polarities, while bursts 506 are positioned in one of two different positions within burst position intervals 504-1, 504-2 based on a separate cryptographically secure pseudo-random number (PN) generator, e.g., CSPRNG-B. Cryptographic keys used to generate sequences for CSPRNG-A and CSPRNG-B can be known to a transmitting first electronic device 102 and a receiving second electronic device 104 and can be unknown to malicious attacker third electronic device 302. The use of CSPRNG sequences provide for robustness against malicious attacks as the pattern of burst position intervals, burst polarities, and burst positions within a burst position interval (time hopping) cannot be ascertained by sniffing for transmissions from the transmitting first electronic device 102.

In some embodiments, time hopping of burst positions within burst position intervals and/or pulse polarities within bursts can be determined by a combination of bits from a CSPRNG sequence and bits from an IEEE 802.15.4 PN generator, e.g. by taking an exclusive or (XOR) of bits from the CSPRNG sequence and bits from the IEEE 802.15.4 PN generator. For example, for the IEEE 802.15.4 data symbol 402 encoding, the IEEE 802.15.4 PN generator can be used to determine a hopping slot (chip) position within the burst position interval 404-1, 404-2 and can also be used to scramble (e.g., via an exclusive or, XOR, function) the pulse polarities of the pulses within the bursts 406. Thus, for each of the options illustrated by Table 510, the burst position interval can be determined by a portion of bits from the CSPRNG-A sequence, the burst polarity can be determine bay a combination of another portion of bits from the CSPRNG-A sequence and bits from the IEEE 802.15.4 PN generator, and time hopping of burst positions within a burst position interval can be determined by one of: the IEEE 802.15.4 PN generator, another portion of bits from the CSPRNG-A sequence, or bits from the CSPRNG-B sequence.

Figure 6:
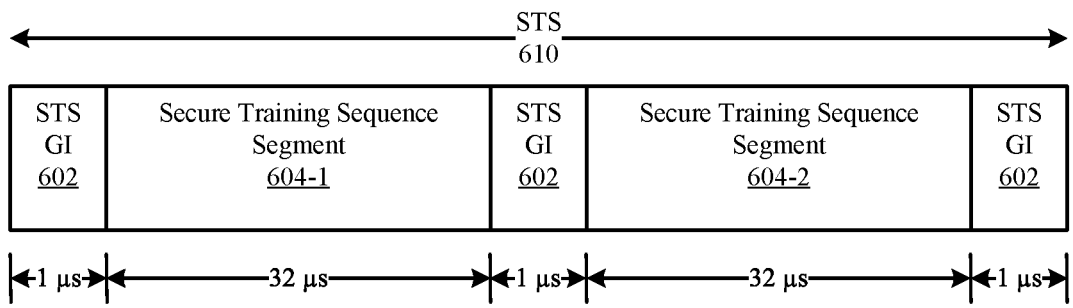
FIG. 6 illustrates a diagram of an exemplary structure for a secure training sequence, in accordance with some embodiments.
Figure 6:
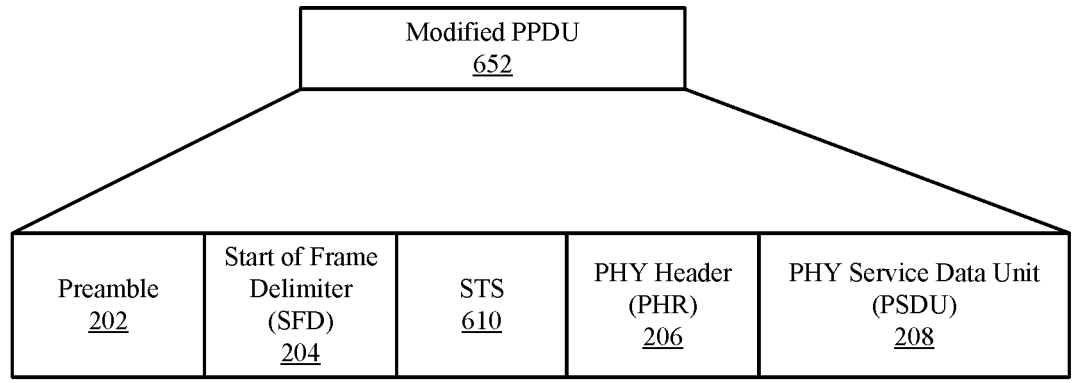

FIG. 6 illustrates a diagram 600 of a structure for a complete secure training sequence (STS). The STS includes a first STS segment 604-1 and second STS segment 604-2, each STS segment 604-1, 604-2 including multiple, typically a large number of, concatenated STS symbols 502. The first STS segment 604-1 can be preceded by an STS guard interval (GI) 602, which is distinct from the guard intervals 508-1, 508-2 for the individual STS symbols 502. An STS GI 602 separates the first STS segment 604-1 and the second STS segment 604-2, and another STS GI 602 follows the second STS segment 604-2. In some embodiments, each STS GI 602 can span a time interval of one micro-second, while each STS segment 604-1, 604-2 can span a time interval of thirty-two micro-seconds. In some embodiments, STS GIs 602 are generated by not transmitting any energy during the time period spanning the STS GI 602. An STS segment 604-1, 604-2 can include 2048 concatenated STS symbols. In some embodiments, the STS includes at least two STS segments. In some embodiments, the STS includes more than two, e.g., three or four, STS segments (not shown). In some embodiments, each STS segment is only known to the first electronic device 102 and the second electronic device 104, and the STS segments 604-1, 604-2, etc., can differ from each other. Each STS segment 604-1, 604-2 can be used to estimate a channel response for a communication channel between a transmitting first electronic device 102 and a receiving second electronic device 104. In some embodiments, the STS segments 604-1, 604-2 can provide separate channel estimates that can be compared with each other for consistency to thwart a malicious attacker that may interfere with one of the STS segments. In some embodiments, the STS segments 604-1, 604-2 can provide a single channel estimate with improved processing gain (relative to a channel estimate based on only a single STS segment). By using the CSPRNG sequence divided across multiple STS segments, the likelihood that a malicious attacker can spoof multiple STS segments to provide an identical result for channel estimation for each STS segment is extremely low. While FIG. 6 illustrates an STS that uses two STS segments, more generally, an STS can be constructed beginning with a first STS guard interval, followed by multiple STS segments separated from each other by STS guard intervals, and ending with a final STS guard interval. The multiple STS segments can be used to provide individual channel estimates, which can be compared with each other for consistency to determine an overall more accurate channel estimate. In some embodiments, the total time span of the STS can be selected based on a coherence time of a communication channel to ensure channel variation is kept below a threshold level so that channel estimates from different STS segments of the STS can be expected to consistent (in the absence of malicious attacker interference). In general, the length of each STS segment and the number of STS segments per STS 610 may vary between different embodiments and for different modes of operation.

FIG. 6 further illustrates a diagram 650 of a modified PPDU 652 that includes an STS 610 positioned after the preamble 202 and SFD 204 and before the PHR 206 and PSDU 208. The preamble 202 of the modified PPDU 652 can use a pre-determined repeated sequence as described earlier for synchronization, timing, gain control, and the adaptive receiver adjustments. The STS 610 can include multiple STS segments 604 formed from multiple STS symbols 502 based on bits output from a CSPRNG, where encryption keys for the CSPRNG are known privately to the transmitting first electronic device 102 and the receiving second electronic device 104 but not published publicly as for the sequence used for the preamble 202. The receiving second electronic device 104 can derive channel estimates using the multiple STS segments 604 and can trust the accuracy of the channel estimate derived therefrom more readily than a channel estimate derived from the preamble 202 or from random data. In some embodiments, the STS 610 immediately follows the SFD 204. In some embodiments, the STS 610 immediately follows the PHR 206. In some embodiments, the STS 610 may follow the PSDU 208. In some embodiments, the STS 610 is included somewhere in the modified PPDU 652 after the SFD 204. In some embodiments, the STS 610 is positioned nearer to the preamble 202 and SFD 204 to reduce channel variation for adaptive receiver settings that are derived initially based on the preamble 202. In some embodiments, the receiving second electronic device 104 compares one or more channel estimates derived from the STS 610 to a channel estimate derived from the preamble 202 for consistency. In some embodiments, the SFD 204 includes a value or a signaling property that indicates the modified PPDU 652 includes an STS 610, e.g., to distinguish from a regular PPDU 210 that does not include an STS 610. In some embodiments, different STS segments 604-1, 604-2, etc., of an STS 610 can be distributed over different locations of the modified PPDU 652, e.g., the STS segment 604-1 of the STS 610 can be located after the SFD 204, while the STS segment 604-2 of the STS 610 can be located after the PSDU 208.

Figure 7:
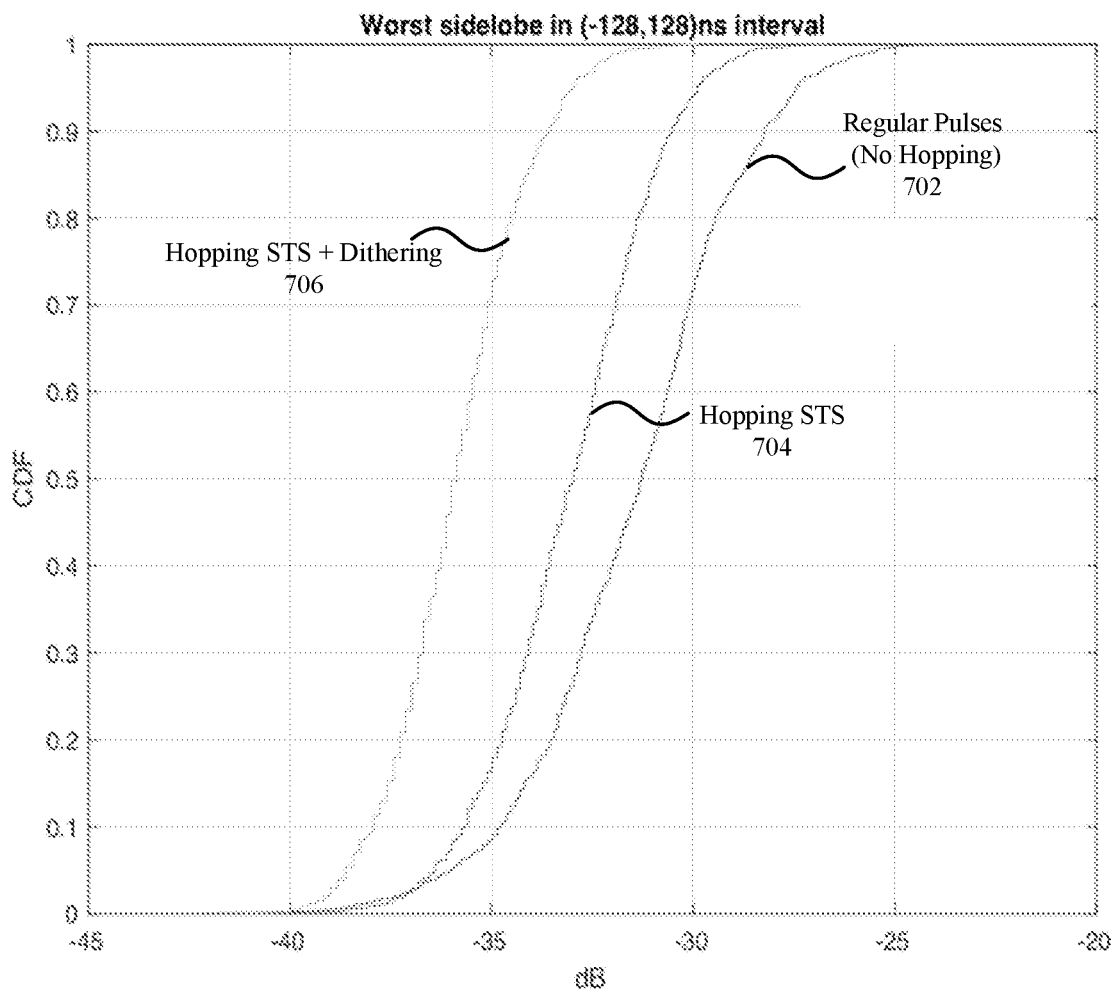
FIG. 7 illustrates a graph of a likelihood probability for detection of a secure training sequence, in accordance with some embodiments.

FIG. 7 illustrates a graph 700 of a cumulative distribution function (CDF) for a probability of reliably detecting a direct peak (shortest path) of a channel estimate based on a measure (in dB) of a worst-case off-peak autocorrelation value relative to a peak autocorrelation value for different scenarios using a CSPRNG. The curve 702 represents a baseline case in which no STS BPM hopping (time hopping) is used, and the CSPRNG bits are mapped directly to pulses using BPSK. The curve 704 represents a simplified case in which STS BPM hopping is used but no time hopping is used. The curve 706 represents a exemplary case in which STS BPM hopping and time hopping (dithering) are both used (e.g., options 1, 2, or 3 of Table 510 in FIG. 5), as described hereinabove. The scenario illustrated by curve 706, which uses a combination of STS BPM hopping and time hopping (dithering), provides approximately 3 dB advantage over the scenario illustrated by curve 704, which uses STS BPM hopping alone and more than 5 dB advantage over the regular pulses (no hopping) scenario illustrated by curve 702.

In some embodiments, the secure training sequence (STS) communication technique described herein is used to perform wireless ranging, e.g., distance estimation, between electronic devices, e.g., between the first electronic device 102, which sends an STS 610, and the second electronic device 104, which receives the STS 610, estimates a channel based on the STS 610, and further estimates a distance between the first electronic device 102 and the second electronic device 104 based on the channel estimate derived from the STS 610.

Representative Embodiments

In some embodiments, a method to support channel estimation using secure training sequences includes a wireless device: (a) generating a set of bits using a cryptographically secure pseudo-random number generator (CSPRNG); (b) forming, based at least in part on the set of bits, a secure training sequence (STS) including a plurality of STS segments, each STS segment of the plurality of STS segments including a plurality of STS symbols; and (c) transmitting the STS in a wireless packet to a second wireless device, where an STS symbol of the plurality of STS symbols includes a burst comprising a single pulse at one of two possible burst position intervals, and selection of a position of the burst within a burst position interval of the two possible burst position intervals and a polarity of the single pulse of the burst are based at least in part on the set of bits generated by the CSPRNG.

In some embodiments, each STS symbol includes the burst at a fixed burst position interval. In some embodiments, selection of the burst position interval for an STS symbol is based at least in part on a publicly known pseudo-noise sequence. In some embodiments, selection of the burst position interval for an STS symbol is based at least in part on the set of bits generated by the CSPRNG. In some embodiments, the method further includes the wireless device generating a second set of bits using a second CSPRNG, where the forming the STS is further based at least in part on the second set of bits. In some embodiments, wherein selection of the burst position interval is based at least in part on the second set of bits generated by the second CSPRNG. In some embodiments, separate bits of the set of bits generated by the CSPRNG are used for selection of the position of the burst within the burst position interval and selection of the polarity of the single pulse of the burst. In some embodiments, wherein the STS symbol is formatted in accordance with an IEEE 802.15.4 data payload structure. In some embodiments, the STS symbol includes a guard interval after the burst position interval of the two possible burst position intervals. In some embodiments, the STS includes a first STS segment and a second STS segment separated by an STS guard interval (GI), and the first STS segment is separated from the second STS segment by an STS guard interval (GI). In some embodiments, the second STS segment is a repetition of the first STS segment. In some embodiments, the first STS segment and the second STS segment are based on different subsets of bits of the set of bits generated by the CSPRNG. In some embodiments, the wireless packet includes a modified physical layer data unit (PPDU) that includes a preamble based on a publicly known pseudo-noise sequence followed by a start of frame delimiter (SFD), and the STS is positioned after the SFD. In some embodiments, the STS is positioned immediately after the SFD in the modified PPDU.

In some embodiments, an apparatus configurable for operation in a wireless device includes a processing subsystem communicatively coupled to a memory subsystem storing instructions that, when executed by the processing subsystem, cause the wireless device to perform operations that include: (a) generating a set of bits using a cryptographically secure pseudo-random number generator (CSPRNG); (b) forming, based at least in part on the set of bits, a secure training sequence (STS) including a plurality of STS segments, each STS segment of the plurality of STS segments including a plurality of STS symbols; and (c) transmitting the STS in a wireless packet to a second wireless device, where an STS symbol of the plurality of STS symbols includes a burst comprising a single pulse at one of two possible burst position intervals, and selection of a position of the burst within a burst position interval of the two possible burst position intervals and a polarity of the single pulse of the burst are based at least in part on the set of bits generated by the CSPRNG.

In some embodiments, selection of the burst position interval for the STS symbol is based at least in part on the set of bits generated by the CSPRNG. In some embodiments, execution of the instructions further causes the wireless device to generate a second set of bits using a second CSPRNG, and the forming the STS is further based at least in part on the second set of bits. In some embodiments, selection of the burst position interval is based at least in part on the second set of bits generated by the second CSPRNG. In some embodiments, separate bits of the set of bits generated by the CSPRNG are used for selection of the position of the burst within the burst position interval and selection of the polarity of the single pulse of the burst.

In some embodiments, a wireless device includes (i) a networking subsystem including one or more antennas; and (ii) a processing subsystem communicatively coupled to the networking subsystem and to a memory subsystem storing instructions that, when executed by the processing subsystem, cause the wireless device to perform operations that include: (a) generating a set of bits using a cryptographically secure pseudo-random number generator (CSPRNG); (b) forming, based at least in part on the set of bits, a secure training sequence (STS) including a plurality of STS segments, each STS segment of the plurality of STS segments including a plurality of STS symbols; and (c) transmitting, via the networking subsystem, the STS in a wireless packet to a second wireless device, where an STS symbol of the plurality of STS symbols includes a burst comprising a single pulse at one of two possible burst position intervals, and selection of a position of the burst within a burst position interval of the two possible burst position intervals and a polarity of the single pulse of the burst are based at least in part on the set of bits generated by the CSPRNG.

Figure 8:
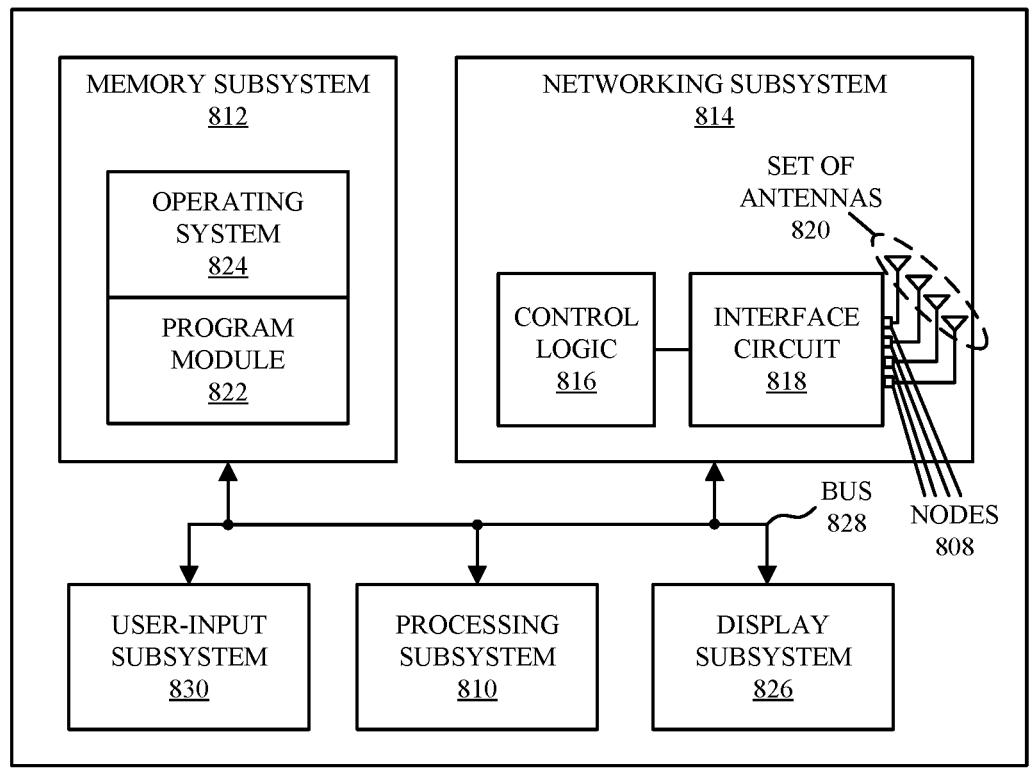
FIG. 8 illustrates a block diagram of an exemplary set of components of an electronic device, in accordance with some embodiments.

FIG. 8 illustrates a block diagram 800 of components of an electronic device, such as electronic devices 102, 104, (which may be a station, a mobile device, an access point, a laptop computer, a smart-phone, a tablet, a smart-watch, etc.), in accordance with some embodiments. The electronic device includes processing subsystem 810, memory subsystem 812, and networking subsystem 814. Processing subsystem 810 includes one or more units configured to perform computational operations. For example, processing subsystem 810 can include one or more microprocessors, application-specific integrated circuits (ASICs), microcontrollers, programmable-logic devices, and/or one or more digital signal processors (DSPs).

Memory subsystem 812 includes one or more units for storing data and/or instructions for processing subsystem 810 and networking subsystem 814. For example, memory subsystem 812 can include dynamic random access memory (DRAM), static random access memory (SRAM), a read-only memory (ROM), flash memory, and/or other types of memory. In some embodiments, instructions for processing subsystem 810 in memory subsystem 812 include: one or more program modules or sets of instructions (such as program module 822 or operating system 824), which may be executed by processing subsystem 810. For example, a ROM can store programs, utilities or processes to be executed in a non-volatile manner, and DRAM can provide volatile data storage, and may store instructions related to the operation of electronic device. Note that the one or more computer programs may constitute a computer-program mechanism, a computer-readable storage medium or software. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810. In some embodiments, the one or more computer programs are distributed over a network-coupled computer system so that the one or more computer programs are stored and executed in a distributed manner.

In addition, memory subsystem 812 can include mechanisms for controlling access to the memory. In some embodiments, memory subsystem 812 includes a memory hierarchy that comprises one or more caches coupled to a memory in the electronic device. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by the electronic device as fast-access storage for often-used data, while the mass-storage device is used to store less frequently used data.

Networking subsystem 814 includes one or more devices configured to couple to and communicate on a wired and/or wireless network (i.e., to perform network operations), including: control logic 816, an interface circuit 818 and a set of antennas 820 (or antenna elements) in an adaptive array that can be selectively turned on and/or off by control logic 816 to create a variety of optional antenna patterns or 'beam patterns.' (While FIG. 8 includes set of antennas 820, in some embodiments the electronic device includes one or more nodes, such as nodes 808, e.g., a pad, which can be coupled to set of antennas 820. Thus, the electronic device may or may not include the set of antennas 820.) The networking subsystem 814 can include a Bluetooth networking system, a cellular networking system (e.g., for a 3G/4G/5G network such as UMTS, LTE, etc.), a universal serial bus (USB) networking system, a networking system based on the standards described in IEEE 802.11 (e.g., a Wi-Fi® or UWB networking system), an Ethernet networking system, and/or another networking system.

Networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, the electronic device may use the mechanisms in networking subsystem 814 for performing wireless communication between electronic devices, e.g., transmitting and/or receiving wireless packets.

Within the electronic device, processing subsystem 810, memory subsystem 812, and networking subsystem 814 are coupled together using bus 828 that facilitates data transfer between these components. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections among the subsystems.

In some embodiments, the electronic device includes a display subsystem 826 for displaying information on a display, which may include a display driver and the display, such as a liquid-crystal display, a multi-touch touchscreen, etc. Display subsystem 826 may be controlled by processing subsystem 810 to display information to a user (e.g., information relating to incoming, outgoing, or an active communication session).

In some embodiments, the electronic device can include a user-input subsystem 830 that allows a user of the electronic device to interact with electronic device. For example, user-input subsystem 830 can take a variety of forms, such as: a button, keypad, dial, touch screen, audio input interface, visual/image capture input interface, input in the form of sensor data, etc.

In some embodiments, the electronic device can be (or can be included in) any electronic device with at least one network interface. For example, the electronic device may include: a cellular telephone or a smart-phone, a tablet computer, a laptop computer, a notebook computer, a personal or desktop computer, a netbook computer, a media player device, an electronic book device, a MiFi® device, a smart-watch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe the electronic device, in alternative embodiments, different components and/or subsystems may be present in the electronic device. For example, the electronic device may include one or more additional processing subsystems, memory subsystems, networking subsystems, and/or display subsystems. Additionally, one or more of the subsystems may not be present in the electronic device. Moreover, in some embodiments, the electronic device may include one or more additional subsystems that are not shown in FIG. 8. Also, although separate subsystems are shown in FIG. 8, in some embodiments some or all of a given subsystem or component can be integrated into one or more of the other subsystems or component(s) in the electronic device. For example, in some embodiments program module 822 is included in operating system 824 and/or control logic 816 is included in interface circuit 818.

Moreover, the circuits and components in the electronic device may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 814. This integrated circuit may include hardware and/or software mechanisms that are used for transmitting wireless signals from the electronic device and receiving signals at the electronic device from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals.)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

The communication techniques described herein may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 822, operating system 824 (such as a driver for interface circuit 818) or in firmware in interface circuit 818. Alternatively or additionally, at least some of the operations in the communication technique may be implemented in a physical layer, such as hardware in interface circuit 818. In some embodiments, the communication technique is implemented, at least in part, in a MAC layer and/or in a physical layer in interface circuit 818.

The various aspects, embodiments, implementations or features of the described embodiments can be used separately or in any combination. Various aspects of the described embodiments can be implemented by software, hardware, or a combination of hardware and software. The described embodiments can also be embodied as computer readable code on a computer readable medium. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method to support channel estimation using secure training sequences, the method comprising:
   by a wireless device:
   generating a first set of bits using a first cryptographically secure pseudo-random number generator (CSPRNG);
   generating a second set of bits using a second CSPRNG;
   forming, based at least in part on the first set of bits and the second set of bits, a secure training sequence (STS) comprising a plurality of STS segments, each STS segment comprising a plurality of STS symbols; and
   transmitting the STS embedded in a wireless packet to a second wireless device,
   wherein:
      an STS symbol of the plurality of STS symbols includes a burst comprising a single pulse at one of two possible burst position intervals,
      selection of a position of the burst within a burst position interval of the two possible burst position intervals is based at least in part on the second set of bits, and
      a polarity of the single pulse of the burst is based at least in part on the first set of bits.

2. The method as recited in claim 1, wherein each STS symbol includes the burst at a fixed burst position interval.

3. The method as recited in claim 1, wherein selection of the burst position interval for an STS symbol is based at least in part on a publicly known pseudo-noise sequence.

4. The method as recited in claim 1, wherein selection of the burst position interval for the STS symbol is based at least in part on the first set of bits.

5. The method as recited in claim 1, wherein the selection of the position of the burst within the burst position interval is further based at least in part on a publicly known pseudo-noise sequence.

6. The method as recited in claim 5, wherein the selection of the burst position of the burst within the burst position interval is based at least in part on the second set of bits combined with the publicly known pseudo-noise sequence using an exclusive or (XOR) function.

7. The method as recited in claim 1, wherein separate bits of the first set of bits generated by the first CSPRNG are used for selection of the burst position interval and for selection of the polarity of the single pulse of the burst within the burst position interval.

8. The method as recited in claim 1, wherein the STS symbol is formatted in accordance with an IEEE 802.15.4 data payload structure.

9. The method as recited in claim 1, wherein the STS symbol includes a guard interval after the burst position interval of the two possible burst position intervals.

10. The method as recited in claim 1, wherein:
the STS includes a first STS segment and a second STS segment separated by an STS guard interval (GI), and
the first STS segment is separated from the second STS segment by an STS guard interval (GI).

11. The method as recited in claim 10, wherein the second STS segment is a repetition of the first STS segment.

12. The method as recited in claim 10, wherein the first STS segment and the second STS segment are based on different subsets of bits of the first set of bits generated by the CSPRNG.

13. The method as recited in claim 1, wherein:
the wireless packet comprises a modified physical layer data unit (PPDU) that includes a preamble based on a publicly known pseudo-noise sequence followed by a start of frame delimiter (SFD); and
the STS is positioned after the SFD.

14. The method as recited in claim 13, wherein the STS is positioned immediately after the SFD in the modified PPDU.

15. An apparatus configurable for operation in a wireless device, the apparatus comprising:
a processing subsystem communicatively coupled to a memory subsystem storing instructions that, when executed by the processing subsystem, cause the wireless device to perform operations that include:
generating a first set of bits using a first cryptographically secure pseudo-random number generator (CSPRNG);
generating a second set of bits using a second CSPRNG;
forming, based at least in part on the first set of bits and the second set of bits, a secure training sequence (STS) comprising a plurality of STS segments, each STS segment comprising a plurality of STS symbols; and
transmitting the STS embedded in a wireless packet to a second wireless device,
wherein:
an STS symbol of the plurality of STS symbols includes a burst comprising a single pulse at one of two possible burst position intervals,
selection of a position of the burst within a burst position interval of the two possible burst position intervals is based at least in part on the second set of bits, and
a polarity of the single pulse of the burst is based at least in part on the first set of bits.

16. The apparatus as recited in claim 15, wherein selection of the burst position interval for the STS symbol is based at least in part on the first set of bits.

17. The apparatus as recited in claim 15, wherein the selection of the position of the burst within the burst position interval is further based at least in part on a publicly known pseudo-noise sequence.

18. The apparatus as recited in claim 17, wherein the selection of the burst position of the burst within the burst position interval is based at least in part on the second set of bits combined with the publicly known pseudo-noise sequence using an exclusive or (XOR) function.

19. The apparatus as recited in claim 15, wherein separate bits of the first set of bits generated by the first CSPRNG are used for selection of the the burst position interval and for selection of the polarity of the single pulse of the burst within the burst position interval.

20. A wireless device comprising:
a networking subsystem including one or more antennas; and
a processing subsystem communicatively coupled to the networking subsystem and to a memory subsystem storing instructions that, when executed by the processing subsystem, cause the wireless device to perform operations that include:
generating a first set of bits using a cryptographically secure pseudo-random number generator (CSPRNG);
generating a second set of bits using a second CSPRNG;
forming, based at least in part on the first set of bits and the second set of bits, a secure training sequence (STS) comprising a plurality of STS segments, each STS segment comprising a plurality of STS symbols; and
transmitting, via the networking subsystem, the STS embedded in a wireless packet to a second wireless device,
wherein:
an STS symbol of the plurality of STS symbols includes a burst comprising a single pulse at one of two possible burst position intervals,
selection of a position of the burst within a burst position interval of the two possible burst position intervals is based at least in part on the second set of bits, and
a polarity of the single pulse of the burst is based at least in part on the first set of bits.

* * * * *

UNITED STATES PATENT AND TRADEMARK OFFICE
CERTIFICATE OF CORRECTION

PATENT NO. : 10,924,303 B2  
APPLICATION NO. : 16/291973  
DATED : February 16, 2021  
INVENTOR(S) : Anuj Batra et al.

Page 1 of 1

It is certified that error appears in the above-identified patent and that said Letters Patent is hereby corrected as shown below:

In the Claims

In Claim 19, at Column 18, Line 25: "used for selection of the the burst position interval and for" should read -- used for selection of the burst position interval and for --.

Signed and Sealed this  
Fourteenth Day of December, 2021

Drew Hirshfeld  
*Performing the Functions and Duties of the  
Under Secretary of Commerce for Intellectual Property and  
Director of the United States Patent and Trademark Office*